L. H. Olmsted,
Friction Clutch.
N° 44,448.  Patented Sep. 27, 1864.

Witnesses,  
Wm. M. Smith  
Chas. E. Olmsted

Inventor  
L H Olmsted

UNITED STATES PATENT OFFICE.

LEVERETT H. OLMSTED, OF NEWARK, NEW JERSEY.

IMPROVEMENT IN FRICTION-CLUTCHES.

Specification forming part of Letters Patent No. 41,448, dated September 27, 1864.

*To all whom it may concern:*

Be it known that I, LEVERETT H. OLMSTED, of the city of Newark, in the county of Essex and State of New Jersey, have invented a new and Improved Friction-Clutch for Connecting Pulleys to Shafts; and I do hereby declare that the following is a full, clear, and exact description of the same, reference being had to the accompanying drawings, forming a part of this specification, in which—

Figure 1:
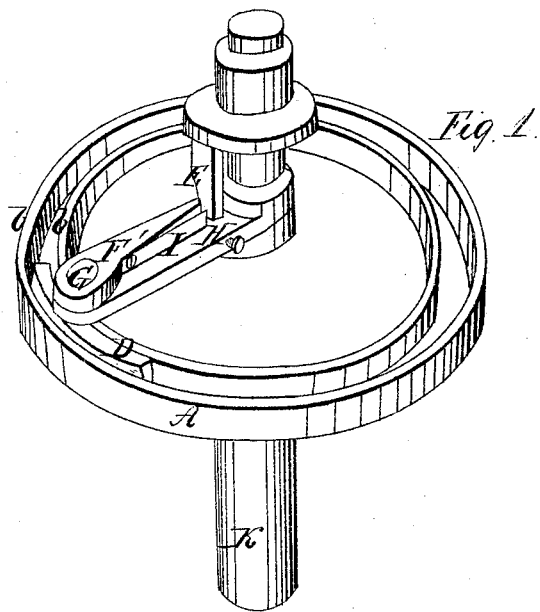
Figure 2:
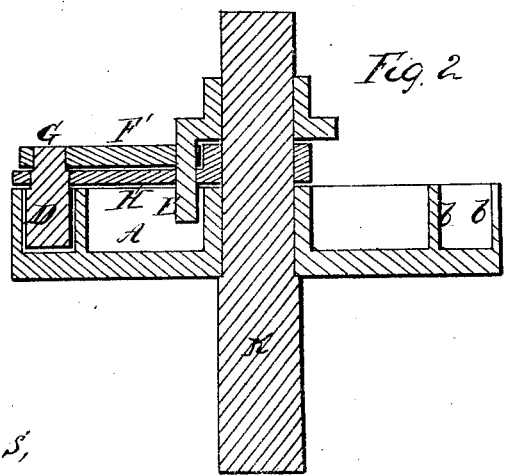

Figure 1. represents a perspective view, and Fig. 2 a section through its axis.

Similar letters of reference indicate corresponding parts.

This invention consists in making a pulley with two flanges, one within the other, and placed sufficient distance apart to admit a friction-block, to which is fastened a stud, the axis of which passes through an arm which is fastened to the shaft. At the outer end of the stud is fastened a lever, which is operated by a wedge which passes through said arm near the shaft, a set screw being put in said arm to bear against said wedge, and arranged so that it may be turned up as the wedge wears away by use. By pushing the wedge through the hole in the said arm, it forces the lever out, and causes the friction-block to bear against the outer and inner flanges simultaneously, and thereby causing sufficient friction to connect the pulley to the shaft. By withdrawing the wedge a spring which is connected to the lever throws said lever back, thereby releasing the friction-block from the flanges of the pulley, and consequently allowing the pulley to turn upon the shaft. There can be two or more friction-blocks applied to the same pulley and operated in the same manner. The lever can also be made to extend around the shaft, and the wedge placed on the opposite side from which it is now represented, and would thereby get more leverage if it is desirable.

To enable those skilled in the art to make and use my invention, I will proceed to describe it with reference to the drawings.

A represents a pulley which has two flanges, b b. D is the friction-block, which is caused to bear against the two flanges of said pulley by means of the wedge E and lever F. The stud G is attached to said friction-block, and is fitted loosely in a hole at the outer end of the arm H, and is extended through said arm sufficient to allow the lever F to be fastened thereto. The spring I is used for the purpose of throwing the lever back when the wedge is withdrawn, and thereby releasing the friction-block from the flange of the pulley, and thereby allowing said pulley to revolve on the shaft K.

What I claim as new, and desire to secure as Letters Patent, is—

1. The combination of the pulley A and friction-block D of a friction-clutch, for the purpose set forth.

2. The combination of the friction-block D, lever F, and wedge E of a friction-clutch, for the purpose set forth.

L. H. OLMSTED.

Witnesses:
 WM. M. SMITH,
 CHAS. E. OLMSTED.